S. F. WAZBINSKI.
MOLD FOR MAKING CEMENT BLOCKS.
APPLICATION FILED FEB. 12, 1917.
1,249,867.
Patented Dec. 11, 1917.
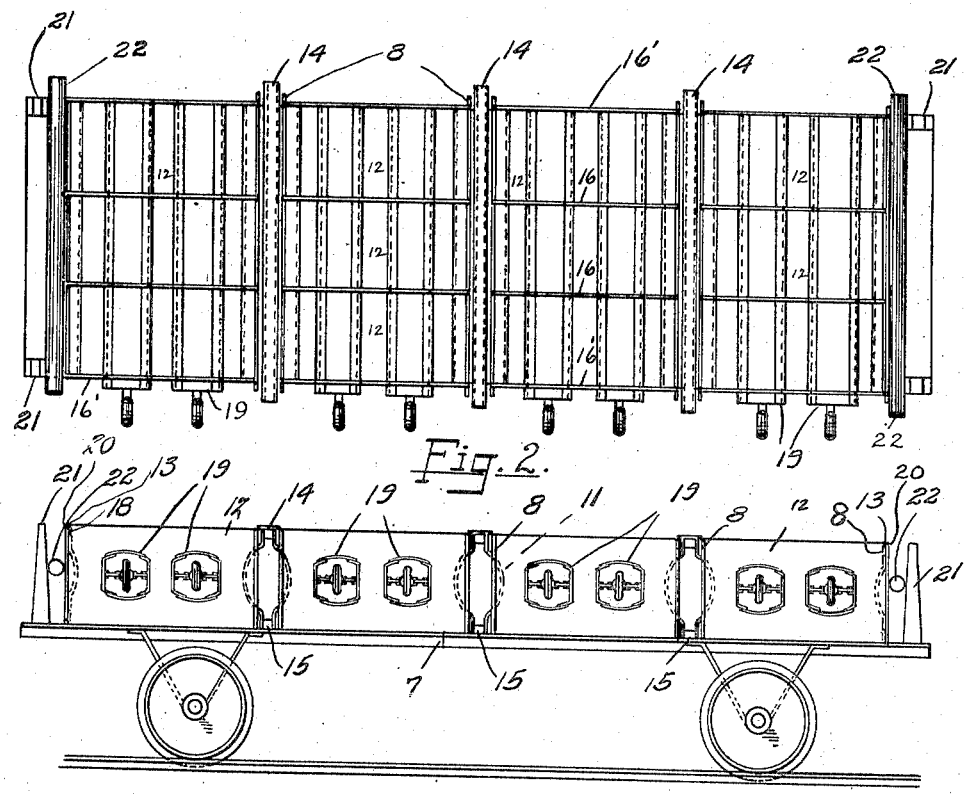
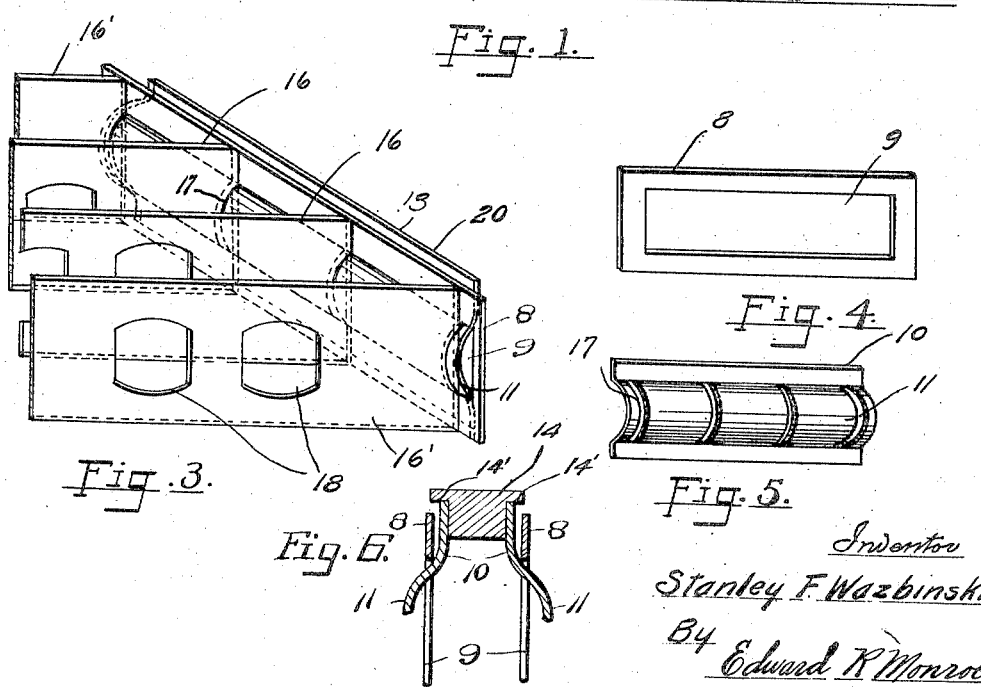

UNITED STATES PATENT OFFICE.

STANLEY F. WAZBINSKI, OF BAY CITY, MICHIGAN.

MOLD FOR MAKING CEMENT BLOCKS.

1,249,867.  Specification of Letters Patent.  Patented Dec. 11, 1917.

Application filed February 12, 1917. Serial No. 148,129.

*To all whom it may concern:*

Be it known that I, STANLEY F. WAZBINSKI, a citizen of the United States of America, residing at Bay City, in the county of Bay and State of Michigan, have invented certain new and useful Improvements in Molds for Making Cement Blocks, of which the following is a specification.

This invention relates to molds for making cement blocks.

One object is to provide a mold composed of a plurality of sections which may be easily and readily assembled and disassembled and in which the parts composing the compartments are interchangeable.

Another object resides in the provision of a mold adapted to be assembled into a plurality of compartments on a wheeled vehicle and on which the parts may be easily and readily assembled to receive the plastic composition, which may become set in the various compartments while the truck is at a standstill or while the truck is being transported from one place to another and whereby the various parts composing the compartments of the mold may be readily and easily disassembled when it is desired to remove the molded material from the mold.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings,

Figure 1 is a side elevation of the invention.

Fig. 2 is a top plan view.

Fig. 3 is a fragmentary detail perspective view of a portion of the mold.

Fig. 4 is a detail view of one of the transverse plates of the mold.

Fig. 5 is a detail view of one of the transverse plates which coöperates with the aforesaid transverse plate for the production of a groove or recess in the molded material.

Fig. 6 is a fragmentary detail sectional view showing one manner of assembling the transverse plates of the mold.

Referring now more particularly to the accompanying drawings, the reference character 7 indicates the body of a wheeled truck or other vehicle or any other suitable base on which my improved mold structure is assembled.

Transversely disposed plates 8 are disposed on the body or platform of the truck and these transverse plates are provided with longitudinal openings 9. Except at the ends of the truck these plates 8 are arranged in spaced pairs with the plates of each pair spaced from its companion plate. Other transverse plates 10 are arranged in pairs between the pairs of plates 8 and these plates 10 of each pair are normally spaced apart with each provided with an oval or other suitably shaped projecting portion 11 designed to project through the longitudinal opening 9 of the adjacent transverse plate 8 for the production of a groove or recess in the end of the block arranged in the respective mold compartment, there being a mold compartment 12 between the pairs of transverse plates. Plates 13, like plates 10, are disposed at the ends of the truck and project through the openings 9 of the end plates 8, as clearly shown in Figs. 2 and 3.

The transverse plates 10 of each pair are maintained in spaced relation to each other and in tight connection with the plates 8 by upper and lower spacing bars 14 and 15, respectively, the upper bars 14 having laterally directed flanges 14' adapted to lie on the top edges of the transverse plates 10 so as to prevent the upper spacing bars 14 from falling down between the plates 10.

The compartments 12 between each pair of plates 8—10 are subdivided by plates 16, 16, 16 and 16' which extend longitudinally of the base 7, the ends of these longitudinally disposed plates being received in slots 17 formed in the projecting portions 11 of the respective plates 10, as shown clearly in the drawings, and particularly in Figs. 3 and 4. The plates 16, 16, 16 have alining openings 18 therein which are designed to receive suitable cores 19 whose inner ends are adapted to lie tightly against the inner faces of the side plates 16', as shown.

It will thus be seen that the longitudinally disposed plates are held against lateral displacement in the slots 17 of the plates 10 and in order to prevent lateral displacement of the transverse plate of the mold, I may secure against or rivet to the end plates 13 suitable plates 20 between which latter and suitable beveled or other posts 21 carried at the ends of the platform or body 7 of the truck or the base, I may insert wedging bars or other elements 22 which may be forced downwardly between the inner beveled faces of the posts 21 and the plates 20 and thereby bind or effect a rigid mold structure. The plates 20 extend across the outer hollow sides of the plates 13 formed by the inwardly deflected portions thereof to present an extended straight surface for the wedging element 22 to obtain a bearing against.

The cores 19 of the mold may be of any suitable structure and of course, the openings 18 in the longitudinally disposed plates will be formed in accordance with the exterior shape of the cores.

It is observed that when the mold is of a multiple character as specified, that is, comprises a plurality of compartments or mold spaces 12, the intermediate partitional parts 8 and 10 may be readily removed before the material has thoroughly set without fear of injury to the product. This also facilitates the setting up of the mold. After the blocks have been molded and the material has set sufficiently to retain the shape, the partitions 8 and 10 may be removed by first withdrawing the bars 14, then removing the plates 10, one at a time, and finally taking out the plates 8. It is noted that when the plates 10 are removed, the longitudinal plates 16 may be easily withdrawn.

What I claim is:—

1. A mold comprising a supporting base provided with posts at its ends, end plates on the base adjacent to and slightly spaced from said posts and having openings therein, a plate adjacent each of the aforesaid plates having a slotted projecting portion extending through the opening in said adjacent plate, pairs of plates between the first mentioned plates and spaced therefrom and from one another, the plates of each pair of said pairs of plates having openings therein, other pairs of plates between the aforesaid pairs of plates and having slotted projecting portions extending through the openings of the first pairs of plates, plates disposed longitudinally of the base and having their ends fitted in the slots of said projecting portions of the transverse plates and provided with alining openings, cores removably mounted in the latter openings, and means engaging said posts to prevent lateral displacement of the transverse plates.

2. A mold comprising a supporting means, spaced pairs of plates on the supporting means, said plates having transverse openings therein, a pair of plates arranged between each of the aforesaid pairs of plates and having longitudinally projecting portions extending through the openings of the first mentioned plates, and division plates arranged between said pairs of plates.

3. A mold comprising a supporting means, spaced pairs of plates on the supporting means, said plates having transverse openings therein, a pair of plates arranged between each of the aforesaid pairs of plates and having longitudinally projecting portions extending through the openings of the first mentioned plates, division plates arranged between said pairs of plates, said division plates having core receiving openings therein, and means for holding the plates in coöperative relation.

4. A mold comprising a supporting means, pairs of plates disposed on the supporting means and having openings therein, a pair of plates arranged between each pair of the aforesaid plates and having projections extending through the openings of the first mentioned plates, said projections having slots therein, division plates arranged at a right angle to the aforesaid pairs of plates and having their ends disposed in the slots of said projections and also provided with core receiving openings, and means for preventing lateral displacement of the pairs of plates.

5. A mold, comprising spaced plates having longitudinal openings, other plates disposed exterior to the spaced plates and provided with longitudinal projecting portions extending through the longitudinal openings of the said spaced plates beyond the inner sides thereof and provided with relatively transverse slots, and longitudinal plates arranged between the said spaced plates, with their ends fitted in the transverse slots of the projecting portions of the exterior plates.

In testimony whereof I affix my signature.

STANLEY F. WAZBINSKI.

Copies of this patent may be obtained for five cents each, by addressing the "Commissioner of Patents, Washington, D. C."